United States Patent [19]

Sinnott

[11] Patent Number: 4,585,135
[45] Date of Patent: Apr. 29, 1986

[54] SCREW CLOSURE

[75] Inventor: Kenneth M. Sinnott, Huntingdon, England

[73] Assignee: W. R. Grace & Co., Lexington, Mass.

[21] Appl. No.: 706,537

[22] Filed: Feb. 27, 1985

Related U.S. Application Data

[63] Continuation of Ser. No. 607,072, May 4, 1984, abandoned, which is a continuation of Ser. No. 469,616, Feb. 25, 1983, abandoned.

[30] Foreign Application Priority Data

Mar. 10, 1982 [GB] United Kingdom ................. 8206980

[51] Int. Cl.[4] ............................................. B65D 53/00
[52] U.S. Cl. .................... 215/329; 215/343; 215/352
[58] Field of Search ............... 215/341, 343, 345, 350, 215/352, 329

[56] References Cited

U.S. PATENT DOCUMENTS

| 3,110,409 | 11/1963 | Chaplin | 215/345 |
|---|---|---|---|
| 3,253,727 | 5/1966 | Hart | 215/345 |
| 3,827,594 | 8/1974 | Leenaards | 215/352 |
| 3,868,038 | 2/1975 | Hadley | 215/341 |
| 4,244,481 | 1/1981 | Kornelis | 215/348 |
| 4,304,744 | 12/1981 | Stroud | 264/25 |
| 4,331,249 | 4/1982 | Banich | 215/352 |
| 4,462,502 | 7/1984 | Luenser et al. | 215/350 X |

FOREIGN PATENT DOCUMENTS

| 47374 | 6/1971 | Australia . |
|---|---|---|
| 0031673 | 12/1980 | European Pat. Off. . |
| 1718460 | 12/1955 | Fed. Rep. of Germany . |
| 1184271 | 12/1964 | Fed. Rep. of Germany . |
| 8100822 | 4/1981 | World Int. Prop. O. . |
| 8100838 | 4/1981 | World Int. Prop. O. . |
| 8202182 | 7/1982 | World Int. Prop. O. . |
| 464721 | 12/1968 | Switzerland . |
| 975739 | 11/1964 | United Kingdom . |
| 1164367 | 9/1969 | United Kingdom . |
| 1203068 | 8/1970 | United Kingdom . |
| 1255739 | 12/1971 | United Kingdom . |
| 1327583 | 8/1973 | United Kingdom . |
| 2022064 | 12/1979 | United Kingdom . |
| 2026995 | 2/1980 | United Kingdom . |
| 2051660A | 6/1980 | United Kingdom . |
| 1577663 | 10/1980 | United Kingdom . |
| 1592793 | 7/1981 | United Kingdom . |
| 2051660B | 4/1983 | United Kingdom . |

Primary Examiner—Donald F. Norton
Attorney, Agent, or Firm—John Dana Hubbard; William L. Baker

[57] ABSTRACT

A bottle closure comprises a cap moulded of a first plastics material includes a skirt having a step between a first inner surface portion and a second inner surface portion of the skirt, and a gasket of a second plastics composition covering a radially outer part of the inner surface of the cap end panel and also the first inner surface portion of the skirt and preferbly at least a part of the second inner surface portion, to achieve a combined side seal and top seal upon application of the closure to a bottle neck.

3 Claims, 4 Drawing Figures

SCREW CLOSURE

DESCRIPTION

This is a continuation of abandoned application Ser. No. 607,072, filed May 4, 1984 which is a continuation of application Ser. No. 469,616, filed Feb. 25, 1983, now abandoned.

The present invention relates to a screw closure e.g. for a bottle, the closure being moulded of plastics material and being effective to provide a gas-tight seal when the contents of the bottle are to be packaged at a pressure which is different from the external atmospheric pressure, for example because the contents are carbonated, giving an internal pressure in excess of the external atmospheric pressure.

Traditionally the packaging of liquids, such as carbonated beverages, under pressure has involved the use of a relatively strong metal screw cap or crown with a sealing gasket to seal between the metal closure and the container neck.

Recently, attempts have been made to provide screw closures of moulded plastics construction for bottle closing in such applications where a superatmospheric pressure is expected within the bottle. Whereas plastics closures have for some time been used with non-carbonated packs where it is possible for the seal formation, e.g. a flexible bead, to be an integral part of the plastics material making up the moulded closure and there is no need for a separately-formed gasket, a more resilient plastics sealing gasket is considered desirable to withstand the pressure of a carbonated beverage in the container. One proposal for lining a threaded plastics cap is disclosed in our U.K. patent specification No. 1327583 in which microwave radiation was to be used for heating the gasket material without damaging the closure.

Other proposals for a plastics screw cap with a relatively softer gasket composition are disclosed in U.K. patent specifications Nos. 1164367, 1203068, 1255739, 1592793, 2022064 and 2026995 all using a separately formed liner snapped in place, or pushed into a socket, in the screw cap. U.K. patent specification No. 1,577,663 discloses a plastics cap having a flowed-in gasket illustrated in the form of a flat annular sheet located on the inner face of the end panel. The sealing action achieved with the bottle closure of British patent specification No. 1,577,663 is solely "top-sealing", in that all of the sealing action is generated by compression of the gasket sheet between the inside of the cap end panel and the end rim of the neck of the bottle, jar or can sealed by the closure.

Another proposal for sealing a liquid under superatmospheric pressure using a lined plastics screw cap is disclosed in WO No. 81/00822 and WO No. 8100838 in which the gasket comprises a flat centre panel keyed to the corresponding surface of the top panel of the screw cap, and is bounded by a peripheral thickened gasket portion which engages a frusto conical neck rim of the container (in this case a specially designed bottle) and which is retained against the screw cap end panel by an integral bead of the screw cap positioned at the root of the cap skirt. This proposal suffers the disadvantage that it requires an unusual bottle neck having a very accurately defined external profile for sealing with the gasket peripheral portion.

Apart from WO Nos. 81/00822, 8100838 and U.K. patent specification No. 1203068 which all require accurate conformity between the gasket and the container neck, the prior proposals for lined plastics screw caps all rely on a solely top sealing action.

A more recent proposal, unpublished at the priority date of the present application, comprises the disclosure of WO No. 82/02182 where a radially inwardly extending rib on the root of the cap skirt traps a rotatable sealing liner for sealing on the neck rim of a plastics bottle.

It is an object of the present invention to provide a lined plastics closure for a pressure-holding pack, for example a carbonated beverage pack, for use with an injection-moulded or blow-moulded threaded container or with other containers such as glass jars or bottles which may have less tight tolerances.

It is another object of the present invention to provide a closure for a container wherein the sealing action is both 'top sealing' and 'side sealing'.

A first aspect of the present invention provides a screw closure comprising a cap of a first plastics material having an end panel and an internally threaded skirt joined to the end panel, the radially inwardly facing surface of the skirt being stepped to define first and second inner surface portions of which the second inner surface portion is further from the end panel, and the said first inner surface portion having a diameter which is smaller than that of said second inner surface portion; and a gasket on the end panel near its junction with the skirt, the gasket being of a second plastics material which is softer than the first plastics material.

The stepped inner periphery to the skirt ensures that upon application of the closure to a container the plastics composition of the gasket will become confined in a narrow gap between the exterior of the container neck and the surrounding said first inner surface portion of the cap skirt, to be compressed tightly in that gap, particularly on the step between the first and second inner surface portions, as the closure is moved axially downwardly onto the neck.

A second aspect of the present invention provides a process of forming a container closure comprising moulding, of a first plastics material, a screw cap having an end panel and an internally threaded skirt, said skirt having on its radially inner surface a step between a first inner surface portion and a second inner surface portion which has a diameter larger than that of said first inner surface portion and includes the internal threading of said skirt; and forming a flowed-in gasket of a second plastics material softer than said first plastics material, said gasket covering (a) at least the radially outer region of said end panel, (b) the said first inner surface portion of the skirt and (c) at least a part of said second inner surface portion of the skirt.

Yet a further aspect of the invention provides a process of closing a container comprising: taking a closure according to the first aspect; effecting relative rotation between said closure and a necked container to be sealed therewith, said container having an external surface portion near the rim of its neck which is just smaller than said first inner surface portion of the skirt to be surrounded by said first inner surface and to define therewith an annular first gap which is smaller than the corresponding annular second gap just to the other side of said step; and continuing said relative rotation between the closure and the container neck until said second plastics composition of the gasket fills said annular first gap and is compressed against the axially outwardly facing end wall of the neck.

In order that the present invention may more readily be understood the following description is given, merely by way of example, with reference to the accompanying drawings in which.

Figure 1:
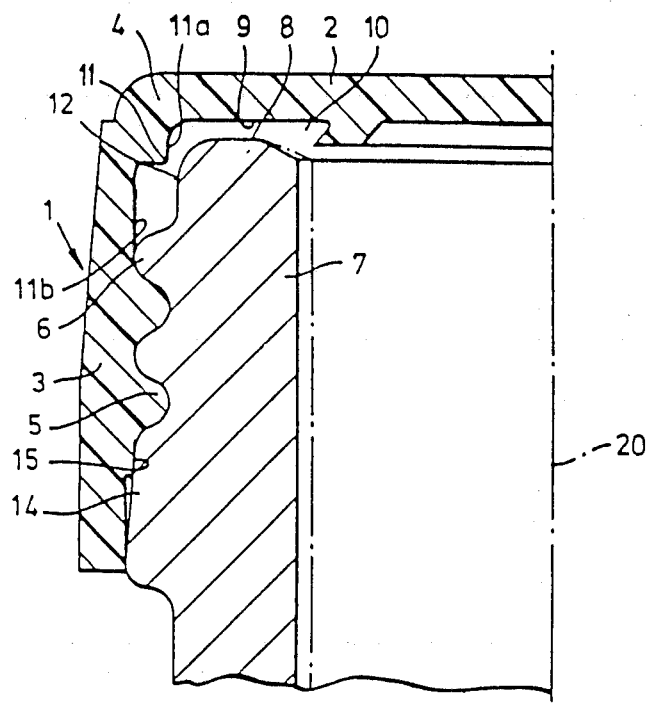
FIG. 1 is a longitudinal sectional view of a first embodiment of moulded closure showing its application to glass finish of the MCA 1 type (but with the gasket composition omitted)
Figure 2:
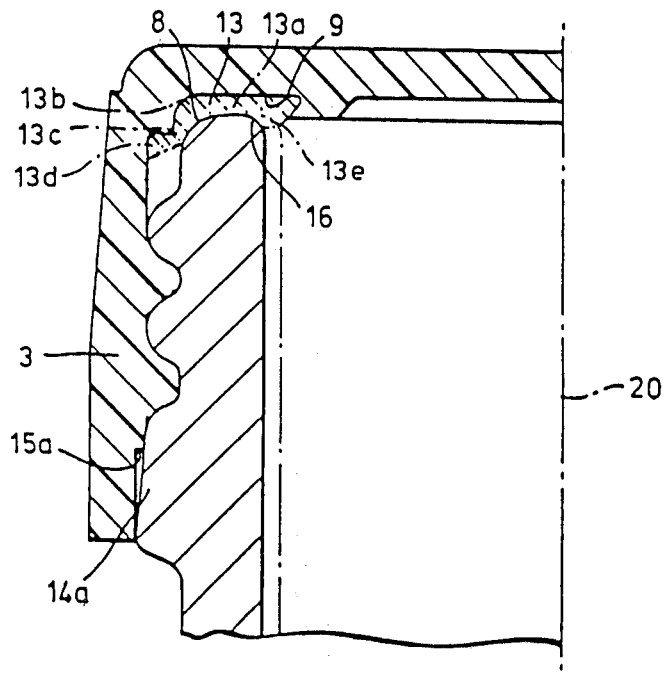
FIG. 2 is a view similar to FIG. 1 but showing a modified arrangement where the glass finish is of the "MCA 2" and "GF 320" type (the glass finish intended for the "Flavorlok" 28 mm pilfer proof closure marketed by Metal Closures Ltd), this time with the gasket material shown.
Figure 3:
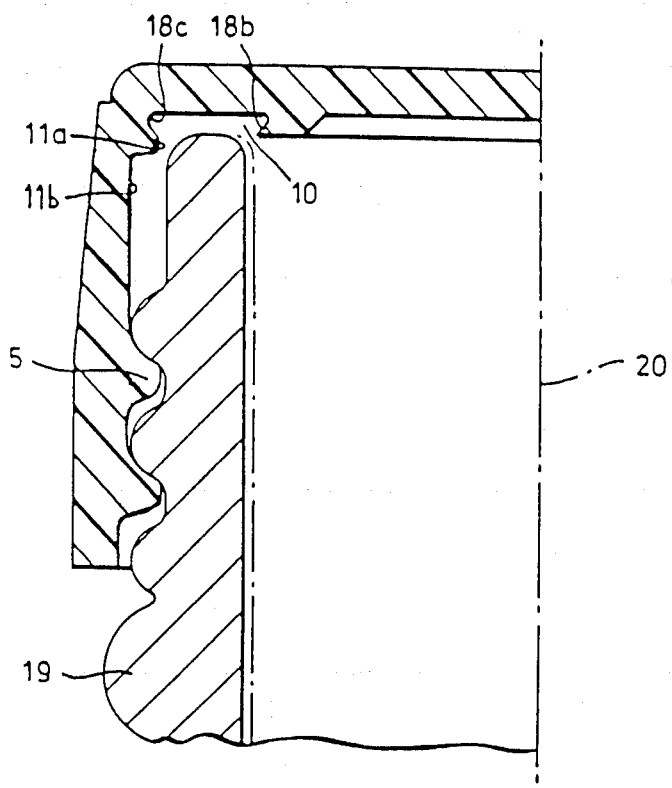
Figure 4:
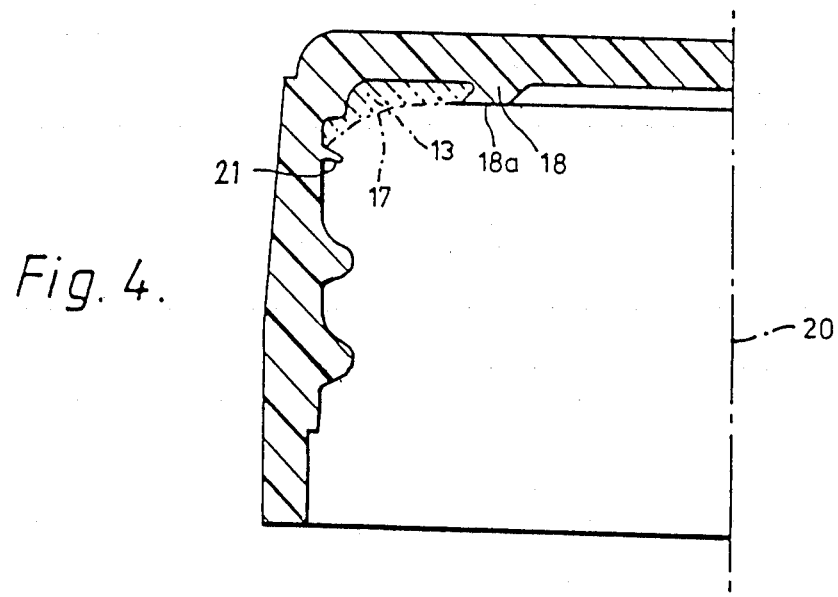

FIG. 3 corresponds to FIG. 1 but shows the "GF 301" type of glass finish (designed for 28 mm Metal Closures Flavorlok closures); and FIG. 4 shows a modified form of the cap of FIG. 2 but before application to the bottle neck.

The moulded closure in accordance with the present invention includes a cap 1 comprising an end panel 2, and a skirt 3, joined to the end panel 2 to define a corner region 4 having a generally cylindrical exterior bearing suitable knurling formations to assist removal of the screw cap 1. The internal screw threading 5 of the skirt may be a single start thread or a multi-start thread.

As an important aspect of the invention, the cap 1 is stepped to include a shoulder 11 projecting radially inwardly near the corner 4 between the end panel 2 and the skirt 3 so as to define, at the "root" of the skirt 3 of the cap, a first inner surface portion 11a of reduced diameter with respect to that of a second inner surface portion 11b. The purpose of this reduced diameter first inner surface portion 11a (which may preferably be cylindrical, as shown) is to define a narrow gap between the internal profile of the skirt root and the substantially cylindrical exterior surface 12 of the container neck (without risk of the second portion 11b fouling the external threading 6 of the neck). As a result, when the cap 1 is driven downwardly onto the end of the neck of, for example, a bottle, the gasket material 13 (see FIGS. 2 and 4) becomes squeezed in the gap between these two surfaces 11a and 12 and provides a region of high compressive stress which enhances the sealing action. The stress is particularly high on the corner of the shoulder 11 at the step from the first inner surface portion 11a to the second inner surface portion 11b. As indicated above, this sealenhancement is equally effective with super-atmospheric pressures inside the container as with infra-atmospheric pressures.

The embodiments shown in FIGS. 2 and 3 have the same important characteristics as the embodiment shown in FIG. 1, but are subject to minor variations in shape in order to accommodate different existing glass finish designs of glass bottles used as the container.

For example, the glass finish configuration in FIGS. 1 and 2 has a deep tapering base portion (14 in FIG. 1 and 14a in FIG. 2) which is omitted from FIG. 3 where there is, instead, a locating toroidal portion 19. The function of this base portion 14 or 14a is to provide a retaining bead for a removable pilferproof extension of the cap where such an extension is provided at the bottom of the skirt 3. Such an alternative is not shown in the drawings but is conventional in the art. In the embodiment of FIGS. 1 and 2 the cap 1 has the radially inward profile of the lower part of its skirt 3 of stepped formation around the base portion 14 (see shoulder 15 in FIG. 1 and 15a in FIG. 2).

The embodiment shown in FIG. 3 has differences, again resulting from the different glass finish for which it is intended, in that the threading 5 of the cap 1 starts much further away from the shoulder 11a at the corner of the cap than does the threading 5 of FIG. 1 from the corner 11 of that embodiment.

The configuration of the gasket material 13 shown in FIG. 2 will be substantially the same for each of the embodiments, taking into account the minor variations of geometry of the cap and of the glass finish. In each case there will be: (a) a relatively flat region 13a compressed between the end wall 8 of the glass finish and the floor 9 of the gasket-receiving recess 10 of the cap; (b) a cylindrical portion 13c under high compression between the skirt first portion 11a and the substantially cylindrical outer surface 12 (FIG. 1) of the container neck at the shoulder 11 (FIG. 1); (c) a transition region 13b at the corner 4 of the gasket-receiving recess 10 between the flat end portion 13a and the cylindrical portion 13c; (d) an optional slightly compressed zone 13a radially inwardly of the flat portion 13a where the gasket material has become extruded around the inner corner 16 of the glass finish; and preferably (e) a relatively deformation-free portion 13d beyond the shoulder 11, i.e. on the second inner surface portion 11a of the skirt.

FIG. 4 shows the configuration of the gasket before compression and in this case the cross-section exhibits a smooth arcuate surface 17 which is substantially a continuation of the flat free end face 18a of a gasket-confining rib 18 on the end panel 2.

The gasket-confining rib 18 optionally has, as can be seen clearly in FIG. 3, an undercut radially outer surface 18b which serves both to limit radially inward migration of the plastics composition during formation of the gasket preferably (by spin-lining techniques) and to prevent detachment of the gasket composition from the gasket-receiving recess 10, by virtue of the undercut shape of the surface 18b.

An optional further gasket-retaining bead 21 (FIG. 4) projects radially inwardly from the cap skirt 3 to limit the extent to which the viscous plastics gasket composition migrates up the cap skirt during spin-lining. Although the gasket should cover the shoulder 11 and is therefore formed so as to cover at least a part of the second inner surface portion 11b, such optional composition in the region 13d does not add significantly to the sealing action and is therefore advantageously kept to a minimum by the bead 21. Such a gasket-retaining flange is analagous to those disclosed in WO Nos. 82/00822, WO/00838 and U.K. Pat. No. 2092999.

In each of the drawings the axis of symmetry 20 of the closure is shown in chain dotted lines so as to give some idea of the overall appearance of the cap, bearing in mind that only one half of the closure cross-section is shown. The dotted outline for the glass finish illustrates the minimum diameter tolerance for the bottle neck internal diameter.

The lining of the already moulded cap is achieved by placing a quantity of a plastics composition, which is softer than that from which the cap 1 is moulded, in the gasket-receiving recess 10 of the already injection-moulded cap and shaping the gasket composition uniformly within the recess 10, up the side of the skirt root, preferably over all of the first inner surface portion 11a and optionally onto the shoulder 11 of the skirt and beyond the shoulder 11, in order to ensure that the shoulder 11 is covered preferably right around the cap circumference. What is important to the present invention is that the annular zone between the substantially cylindrical external surface 12 of the bottle neck and the first portion 11a of the cap skirt interior surface should be (a) filled with plastics composition when the cap is applied to the bottle and (b) subjected to sufficient compressive stress in order to enhance the sealing action when the cap is fully closed onto the bottle.

The cap 1 may be moulded of any suitable thermoplastic or thermoset polymer for example an olefin polymer. Specific examples include polypropylene, polyethylene, an ethylene-propylene copolymer, and a blend of polypropylene and polyethylene.

The gasket may preferably be flowed in, and shaped in any one of several possible ways. For example, one method comprises spinning a plastisol, i.e. a dispersion of a resin (for example a vinyl resin) in a plasticiser, in the gasket-receiving recess 10 of a cap 1. The cap may then be preheated, for example in a hot air oven, before being heated for fluxing the plastisol, i.e. applying heat to cause the vinyl resin to absorb the plasticiser so as to form what can be regarded as a solid solution and thereby be capable of producing a solidified gasket upon cooling. The application of heat may be effected by use of microwave energy, for example as disclosed in our British patent specification No. 2,051,660A. In that British patent specification there is mention of various possible materials for use as both resin and plasticiser, and it is also indicated that the microwave energy application system allows moulded caps to be equipped with a gasket of a conventional PVC resin plastisol. The cap is substantially transparent to the microwave energy and consequently the microwave heating achieves fluxing of the plastisol without any distortion of the previously injection-moulded cap 1.

Another possible method for lining the cap 1, again using the spin lining technique, is to dispense a thermoplastic gasketing material heated to liquid or other form, optionally mixed with a foaming gas, into the cap 1 while the cap is being spun in a chuck, so that when the gasketing material cools it forms in the cap a gasket which may be of closed cell foam type. No further heating, for fluxing the gasket, is envisaged with this system. Such a process, with foaming, is described and claimed in European patent application No. 0031673. Compositions suitable for this system comprise ethylene homopolymers and/or copolymers, for example ethylene vinyl acetate copolymer and one or more resins, for example of the rosin ester type. The compositions may also include a surfactant, nucleating agent, and pigment. As indicated above, the plastisol compound and the molten thermoplastic material are applied to the plastic cap by spin lining.

The gasketted closures, formed as described above, are then applied by screwing up onto the container neck, e.g. the glass finish of FIGS. 1, 2 or 3, after the container has been filled, preferably with a carbonated liquid in order to exploit the pressure-holding characteristics of the closure in accordance with the present invention.

It will of course be appreciated that application of the closure onto the neck is carried out by a screwing-up action using an appropriate rotating chuck to hold the closure relative to the neck while the container and/or the closure can be driven to rotate.

The closure is reclosable, in that after unscrewing by the user to open the container the container can then be manually reclosed with the same closure.

To enhance retention of the gasket to the cap, the cap 1 may be provided with the optional radially outer undercut 18c shown in FIG. 3, and also the cap end panel (e.g. the floor 9 of the gasket-receiving recess 10) may be moulded to have a rough surface finish.

In order to evaluate the improvement afforded by the present invention, comparative tests were made using a nominal 28 mm closure in accordance with the present invention (designed according to FIGS. 1 and 2), and a "comparison closure" having the same general dimensions but lacking the stepped internal surface portion at the root of the skirt in that the larger radius second inner surface portion 11b extended substantially to the plane of the floor 9 of the gasket-receiving recess. However for convenience the "comparison closure" did include a small keying flange near the junction of the skirt and the top panel of the closure, so as to help to ensure location of the gasket in the closure. No similar flange was incorporated in the closure of FIGS. 1 and 2.

The gasket composition used was a hot melt plastics material which is solid at room temperature and at temperatures up to its melting point (which is high enough to exceed any temperature to which a commerical pack is subjected during storage but this melting point of the gasket 13 is lower than the melting point of the plastics material used for the cap 1 itself). The results of these comparative tests are given in the following example:

A series of test runs was carried out by forming a flowed-in gasket in a series of the closures shown in FIGS. 1 and 2 and in a similar number of comparison closures which lacked the stepped inner surface according to the invention, and these closures were each lined with three separate volumes of the gasket composition.

In the case of the closures according to FIGS. 1 and 2, the smallest volume is the minimum required to cover the shoulder 11 in the case of the closures having the "corner feature" formed by the step in the inner surface of the skirt wall, and the other two values are increased over that minimum value by 10% and 20%, respectively.

In the case of the comparison closures, the minimum film volume chosen was about 10% higher than that used for the closures according to FIGS. 1 and 2, and again two further correspondingly greater values were also used.

The lined closures were then applied to a standard set of glass bottles at various different application torques the precise values of which were not noted but which are represented, in the first column "machine setting" of Tables 1 and 2, by a numeral which represents the number of incremental increases in pre-stressing of a spring controlling the application torque clutch. Closures applied with the machine set at "increment 1" were not properly closed, and comparison closures applied with the machine set at "increment 10" were found to break due to excessive stressing. The "machine setting 7" condition corresponds to a slowly applied (i.e. virtually static) application torque of 12 in.lb (13.8 cm.Kg).

The sealing performance of each of these closures was measured in terms of the pressure at which the closures starts to vent, when the closed bottle is subjected to the following test procedure. Initially the pressure is increased to 100 lbs/in$^2$ (689 KPa) and held at that pressure for one minute. Then the pressure was increased to 150 lbs/in$^2$ (1034 KPa) following which it was held steady for two minutes. Next the pressure was increased to 175 lbs/in² (1207 KPa) and then held for a further two minute period, and finally the pressure was increased to 200 lbs/in² (1379 KPa) and held for ten seconds before release of pressure. The tests were carried out using GF320 glass finish (equivalent to MCA2) and the head load on the closure applicator was set at 40 Kg. Table I below gives the pressure at which the onset of venting is observed. The test is carried out with the closed bottle neck just below the surface of a water bath in an Owens Illinois Secure Seal Tester and venting is observed in the form of bubbles escaping from between the closure and the glass finish.

The removal torque test was carried out using an United Glass "KORK-A-TORQUE" Torque Tester to remove the closure two minutes after closing of the bottle. The bottle (glass finish GF320) was filled with Schweppes tonic water at 4° C. and the glass around the sealing area was wetted before closing.

Table II shows that, in most cases, the removal torque is slightly higher in the case of the closure according to FIGS. 1 and 2 than in the case of the comparison closure. However, a removal torque of above 18 in.lbs (20.7 cm.Kg) is considered as being unacceptably high for a reclosable bottle closure and it is clear from the results that only when the application torque is increased to "increment 9" is the removal torque too high. In the case of the closure according to FIGS. 1 and 2, the removal torque remains below 18 in.lbs (20.7 cm.Kg) and is as low as 10 in.lbs (11.51 cm.Kg) at "increment 2",—the minimum application torque to ensure closing in the case of the comparison closure.

Bearing in mind that the application head includes the possibility of five intermediate machine settings between "increment8" and "increment 2", the maximum and minimum values covered by this test, the closure in accordance with the present invention performs much better in that the removal torque is always within ac-

TABLE I

| | VENTING PRESSURE - LB/IN² (KPa) | | | | | |
|---|---|---|---|---|---|---|
| Machine | COMPARISON CLOSURE | | | CLOSURE OF FIGS. 1 AND 2. | | |
| Setting | 290 mg | 300 mg | 330 mg | 260 mg | 280 mg | 300 mg |
| 7 | 160+ (1102) | 160+ (1102) | 188+ (1296) | 200+ (1378) | 200+ (1378) | 200+ (1378) |
| 2 | 122 (841) | 127 (875) | 134 (923) | 200+ (1378) | 200+ (1378) | 199+ (1371) |

In Table I above and Tables II and III below the film volumes are expressed as film weight which is easier to determine.

As can be seen from Table I above, the venting pressure results for a bottle closed under an application torque giving "increment 7"—equivalent to 12 in.lb (13.8 cm.Kg)—give a venting pressure of at least 200 lbs/in² (1379 KPa) in the case of a closure according to FIGS. 1 and 2, but the comparable test on the "comparison closure" gives venting pressures of just above 160 lbs/cm² (1103 KPa) in the case of the minimum and intermediate film volume and a value of 188 lbs/cm² (1296 KPa) in the case of the highest film volume.

When the application torque is reduced to "increment 2" in each case the venting pressure result obtained with the closure of FIGS. 1 and 2 is substantially unchanged whereas the venting pressure of the comparison closure has dropped to a value from 122 lbs/cm² (841 KPa) to 134 lbs/cm² (924 KPa).

Table II below compares the removal torque values obtained under comparable test conditions on the two closure types.

ceptable limits and the venting pressure is in almost every case in excess of 200 lbs/in² (1379 KPa) whereas with the comparison closure, the removal torques are slightly reduced but the venting performance is not appreciably improved.

A further test which is conventionally carried out in order to determine acceptability from a commercial point of view concerns closure venting performance. This was considered an important test in order to ensure that despite having better pressure-holding qualities by virtue of the stepped skirt root, the ability of the closure to vent safely during removal was not affected. The closure venting performance tests were carried out in a Coca-Cola (RTM) tester incorporating a flowmeter measuring the flow of compressed air into, and therefore out of, the test bottle, as the closure was progressively removed by monitored rotation. It is necessary for the closure to begin venting after rotation through no more than 100° from fully closed, and the closure should remain attached to the bottle neck by virtue of the interengaging threads at all angles below 270° of removal rotation. Furthermore the air flow during the

TABLE II

| | REMOVAL TORQUE - IN · LBS (CM · KG) | | | | | |
|---|---|---|---|---|---|---|
| Machine | COMPARISON CLOSURE | | | CLOSURE OF FIGS. 1 AND 2. | | |
| Setting | 290 mg | 300 mg | 330 mg | 260 mg | 280 mg | 300 mg |
| 9 | 15.4 (17.7) | 21.4 (24.6) | 21.4 (24.6) | 16.8 (19.3) | 20.6 (23.7) | 20.8 (23.9) |
| 8 | 14.6 (16.8) | 16.2 (18.6) | 16.6 (19.1) | 15.0 (17.2) | 16.6 (19.1) | 16.8 (19.3) |
| 7 | 13.2 (15.2) | 15.2 (17.5) | 15.0 (17.2) | 14.2 (16.3) | 15.2 (17.5) | 15.0 (17.2) |
| 6 | 12.2 (14.0) | 12.6 (14.5) | 12.0 (13.8) | 12.6 (14.5) | 12.4 (14.3) | 12.8 (14.7) |
| 5 | 13.4 (15.4) | 12.0 (13.8) | 11.8 (13.6) | 13.6 (15.6) | 13.0 (15.0) | 13.6 (15.6) |
| 4 | 11.4 (13.1) | 11.4 (13.1) | 11.0 (12.7) | 12.6 (14.5) | 12.4 (14.3) | 12.0 (13.8) |
| 3 | 10.8 (12.4) | 9.8 (11.3) | 10.4 (12.0) | 12.2 (14.0) | 10.6 (12.2) | 11.0 (12.7) |
| 2 | 9.6 (11.0) | 9.4 (10.8) | 9.6 (11.0) | 10.0 (11.5) | 10.0 (11.5) | 10.2 (11.7) | venting stage should be in excess of 400 Ft³/hr (11.33 m³/hr) for angles of up to 250°. The results of this closure venting performance are shown in Table III below.

TABLE III

CLOSURE VENTING PERFORMANCE

| FILM WT | VENT ANGLE | FLOW RATES Ft³/hr (m³/hr) at | | | SEPARATION OCCURS AT |
| --- | --- | --- | --- | --- | --- |
| | | 100° | 150° | 200° | |
| 265 mg | 35° | 315 (8.92) | 455 (12.88) | 500 (14.16) | 280° |
| 265 mg | 30° | 310 (8.78) | 440 (12.46) | 490 (13.88) | 280° |
| 265 mg | 30° | 315 (8.92) | 450 (12.74) | 470 (13.31) | 290° |

In the closure venting performance tests, the closure in accordance with FIGS. 1 and 2 gave satisfactory performance and is considered commercially acceptable. No closure venting performance tests were carried out with the comparison closure it had already failed the pressure retention test.

Additional tests were carried out using further modified 28 mm closures in accordance with the present invention (in which the axial length of the first inner surface portion 11a was increased with respect to the otherwise identical cap shown in FIGS. 1 and 2, used in the previous tests). The results gave marginally increased removal torques and no detected improvement in sealing performance.

Although in FIGS. 1 to 4, the cap 1 has a gasket-receiving recess confining the gasket to the radially outer part of the cap top panel, this is optional in that the gasket could extend right in to the centre of the top panel.

I claim:

1. A closure for a container comprising a molded cap comprising a first plastics material, said cap having an end panel and a skirt downwardly depending from the end panel, the skirt having a radially inwardly facing surface stepped to define a first and a second inner surface portion of which the second inner surface portion is further from the end panel, and the first inner surface portion has a diameter smaller than the second inner surface portion, the skirt being internally threaded for engagement with external threading on a neck of the container the internal threads of the skirt being separated from the first and second inner surface portions and the end panel by a substantially planar surface; and a gasket formed in situ on the end panel near its junction with the skirt, the gasket comprising a second plastics material which is softer than the first plastics material, said gasket extending over the first inner surface portion and at least a part of the second inner surface portion such that when the closure is driven downwardly onto the neck of the container a side seal is formed.

2. A closure for a container comprising a molded cap of a first plastic material, the cap having an end panel and an internally threaded skirt extending downwardly from the end panel, the end panel being substantially planar the skirt having a substantially thickened area adjacent the end panel and a substantially planar area between the substantially thickened area and the internal threads, and a gasket formed in situ on the end panel and extending over the substantially thickened area onto the skirt, the gasket comprising a second plastic material which is softer than the first plastic material.

3. A closure for a container comprising a molded cap having an end panel and a skirt depending downwardly from the end panel and having internal threads, a shoulder formed at a junction between the end panel and the skirt, the skirt having a substantially planar surface extending downwardly on a side of the skirt opposite the end panel from the shoulder to the internal threads and a gasket formed in situ on the end panel and extending over the shoulder and at least a part of the substantially planar surface of the skirt.

* * * * *